(12) United States Patent
Lo et al.

(10) Patent No.: US 8,070,308 B1
(45) Date of Patent: Dec. 6, 2011

(54) HELMET MOUNTED BICYCLE LIGHTS

(75) Inventors: Roxanne Lo, Santa Cruz, CA (US); Christopher McCaslin, Alameda, CA (US); Doug Foss, Pacific Grove, CA (US); Damon Campbell, Pacific Grove, CA (US); Daniel T. Emerson, Carmel, CA (US)

(73) Assignee: Light & Motion Industries, Monterey, CA (US)

( * ) Notice: Subject to any disclaimer, the term of this patent is extended or adjusted under 35 U.S.C. 154(b) by 0 days.

(21) Appl. No.: 12/799,082

(22) Filed: Apr. 16, 2010

(51) Int. Cl.
*F21V 21/084* (2006.01)

(52) U.S. Cl. ........ 362/106; 362/105; 362/169; 362/184; 362/249.01; 362/249.12

(58) Field of Classification Search .................. 362/105, 362/106, 103
See application file for complete search history.

(56) References Cited

U.S. PATENT DOCUMENTS

| | | | | |
|---|---|---|---|---|
| 5,588,736 A * | 12/1996 | Shea, Sr. | ........................ | 362/570 |
| 5,688,039 A * | 11/1997 | Johnson | ........................ | 362/106 |
| 6,283,620 B1 * | 9/2001 | Taylor et al. | ................... | 362/474 |
| 6,497,493 B1 * | 12/2002 | Theisen | ........................ | 362/105 |
| 7,264,368 B2 * | 9/2007 | Sherring | ........................ | 362/105 |
| 2004/0010832 A1 * | 1/2004 | Witkoff | ................................. | 2/12 |
| 2005/0180128 A1 * | 8/2005 | Sinegal et al. | ................ | 362/105 |
| 2008/0310145 A1 * | 12/2008 | Blake et al. | ................... | 362/105 |
| 2009/0161348 A1 * | 6/2009 | Spartano et al. | .............. | 362/105 |
| 2010/0045928 A1 * | 2/2010 | Levy | ............................. | 351/158 |

* cited by examiner

*Primary Examiner* — Evan Dzierzynski
(74) *Attorney, Agent, or Firm* — Thomas M. Freiburger (57) ABSTRACT

A bicycle light system has front and rear (white and red) lights with mounting brackets to secure on a bicycle helmet. A rechargeable battery is contained in the rear light casing, with an electrical cord extending between the front and rear light casings. The front light casing has controls for both front and rear lights, which can include different power levels and preferably a flash mode for the front light. 360° visibility preferably is provided via the front light, which projects colored light, such as amber, toward the sides. In a preferred embodiment the battery is rechargeable using a micro USB connection, a serial bus configuration widely used for cell phones, so that the battery will ordinarily be rechargeable via a cell phone recharging cable or a connection to a computer. Helmet mountings for the front and rear light casings have a quick-release feature enabling the lights to be easily and quickly removed from the helmet, such as for recharging.

21 Claims, 8 Drawing Sheets

HELMET MOUNTED BICYCLE LIGHTS

BACKGROUND OF THE INVENTION

This invention concerns lighting for bicycles, and especially a compact set of front and rear lights to be mounted on the bicycle rider's helmet.

Bicycle riders have had a wide array of different options for night lighting, both to illuminate the path ahead and to warn those behind in vehicles or on other bicycles, using a red rear-facing light. These have included handlebar-mounted front lights, including high-powered lights connected to battery packs secured to bicycle frame bars, lower-powered head lamps that mount on handlebars with batteries contained in the light housing, and some lights provided for mounting on the rider's helmet. These helmet lights include bike lights marketed by Exposure Lights of West Sussex, England, under the name Joystick, and these have a helmet mounting for securing the flashlight-shaped light housing, containing a rechargeable battery, to the top center of a helmet. This is done with a bracket mounting configured to extend through a top center vent of the helmet with two opposed disc-like elements then screwed to draw them together to clamp onto the helmet. The flashlight casing has a rear port into which a connector can be secured to conduct power through a cord to a red rear light if desired. The red rear light is provided with a short cable and a VELCRO strap to secure directly to the helmet. These lights positioned at a high point on top of the rider's helmet put considerable weight at a high location, tending to make the helmet feel top heavy. The rider can feel the high center of gravity on the helmet, especially from the weight of batteries in the flashlight housing. In addition, this top projection on the helmet is subject to being damaged and knocked off the helmet by objects such as tree branches. Switch control of the light is not convenient when riding. Further, in a helmet with a center rib, as is most typical currently (rather than a center vent), the Exposure Light must be off-center because it must be positioned over a vent.

There is a need for an efficient, compact and lightweight helmet-mounted lighting system for bicycle riders, in which front and rear lights are mounted in low positions in the helmet, controls for light settings are conveniently accessible, and removal of the lights from the helmet is quick and efficient without requiring disconnection of mounting brackets.

SUMMARY OF THE INVENTION

A system of bicycle lighting of the invention includes front and rear lights connected by a cable and each being mountable on a bicycle helmet. The red rear light has a casing that contains a rechargeable battery and is positioned at a low position at the rear of the helmet. The separate front light assembly, without battery, has a swivel-mounted casing (for up/down aim adjustment) on a base secured at a low position at the front of the helmet, and this casing includes the manual control for light power settings. The front lamp is powered by the rear casing battery, via the cable.

Mounting brackets for each of the front and rear lights are easily secured to opposite positions on the helmet and can remain in place, with the light casings themselves being quickly removable from the brackets for recharging or for security. The front mount includes a backing, enabling the front light to be mounted over either a rib or a vent of the helmet.

An important feature of the invention is that the primary weight of the light system is mounted low at the rear of the helmet, in the casing that holds the red rear lights, with the front light also mounted low on the helmet and powered through a cable connected to the rear of the casing. Controls are conveniently positioned on the front light, controlling both the front and rear lights as to power and flash status. Another important feature is that the front light includes an amber light providing side lighting toward both sides, thus providing for 360° visibility of the rider. The amber side light can also be included on the rear light.

The battery is conveniently recharged by quick removal of both lights from their mounting brackets and use of a micro USB cable for recharging, which can be a mobile phone recharging cable or the battery can be recharged from a computer using the same type of connection. The battery remains in the housing for charging. For charging, lights can be left on the helmet as well, since the recharge port is readily accessible when the lights are on the helmet.

The front and rear lights can easily be attached to the helmet even with the helmet on the user's head. The quick connect/disconnect attachments to the base allow for attachment by feel.

It is therefore among the objects of the invention to improve over prior night lights for bicycles, through the provision of a front and rear lighting system easily attachable to a helmet and mounted at low positions at front and rear of the helmet, with quick removal of the lights from the helmet, convenient recharging, and minimal total weight. These and other objects, advantages and features of the invention will be apparent from the following description of a preferred embodiment, considered along with the accompanying drawings.

DESCRIPTION OF PREFERRED EMBODIMENTS

Figure 1:
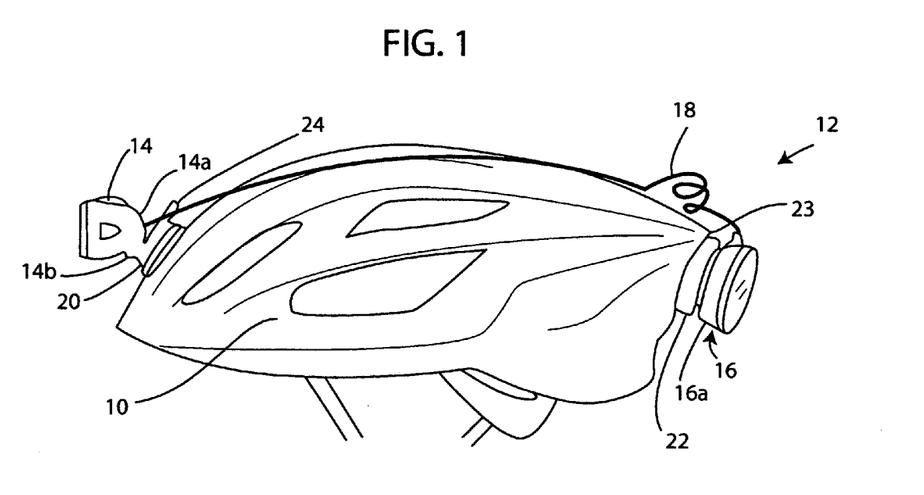
FIG. 1 is a profile view showing a bicycle helmet with the lighting system of the invention.

In the drawings, FIG. 1 shows a bicycle helmet 10 on which the lighting system 12 of the invention is mounted. The lighting system 12 includes a front-mounted forward light assembly 14 and a rear-mounted light assembly 16 that also contains a battery or batteries for both the front and rear lights. The rear light assembly 16 connects to the front light 14 by a small cable 18. As seen in the drawing, each of the light assemblies has a housing or housing assembly 14a, 16a, that connects to a base 20, 22, respectively, these bases being secured by straps to the helmet 10. The straps are passed through openings in the helmet at or near the front and rear, with the bases 20, 22 bearing against helmet structure between openings. The bases 20 and 22 are mounted at positions low on the helmet, for a low center of gravity, particularly the rear light assembly 16 that includes the battery or batteries, which are a large portion of the weight of the entire assembly 12. The total weight of the lighting system in a preferred form is less than about 135 grams, more preferably less than about 130 grams, with most of the weight (about 70% to 75%) in the rear assembly 16. The front light 14 is mounted approximately as far forward on the helmet as possible as determined by the vent opening configuration, thus as low as possible at front. Its light housing 14a pivotally adjusts within a vertical sagittal plane, on a transverse horizontal pivot axis 14b. The rear light 16 is mounted against an angled, nearly vertical rear-facing tail surface 23 as present on a typical helmet, via vent openings at that location. In a preferred embodiment the center of gravity of the lighting system is about halfway up the height of the helmet, or lower, although the user can choose to place one or both of the lights higher if desired.

As illustrated in some of the other drawing figures, the front 14 and rear 16 light assemblies are quickly removable from their bases. In this preferred embodiment the rear housing 16a is simply pulled outwardly free of the base 22, while at the front a lever 24 is pushed downwardly toward the helmet to enable sliding the forward light downward/forward to remove it. The assembly can thus be removed in a second or so, for charging via the rear housing 16a or for security against theft.

Figure 2:
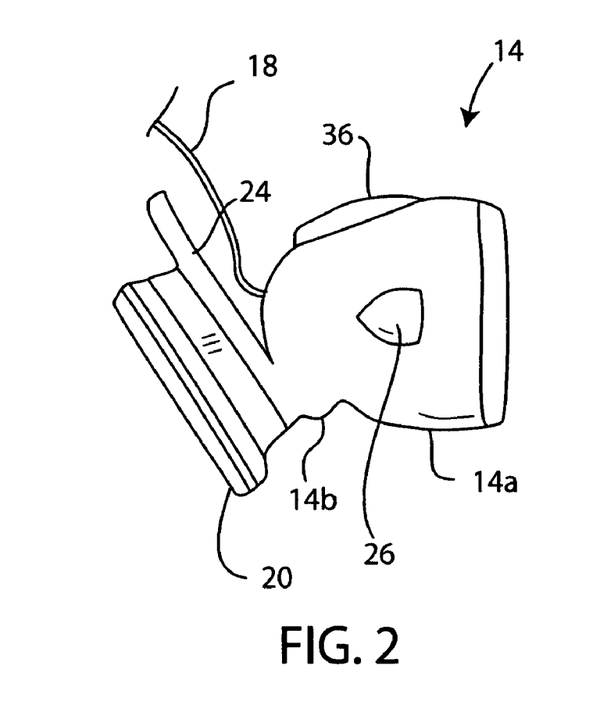
FIG. 2 is a side view of a front light of the lighting system.

FIG. 2 shows a profile of the front light assembly 14, showing the main housing or casing 14a as pivotally mounted at 14b on its release lever 24 (the term front light housing as used herein includes the casing and the release lever). The base 20, to which the mounting lever 24 is attached, is shown without its strap. The front light 14 directs light forward but also preferably includes a side light 26 directing an amber colored light toward both sides. This side lighting can be provided by the same light source (preferably an LED) that provides the forward lighting. A switch button is at 36 on the top of the light housing, as discussed below.

Figure 3:
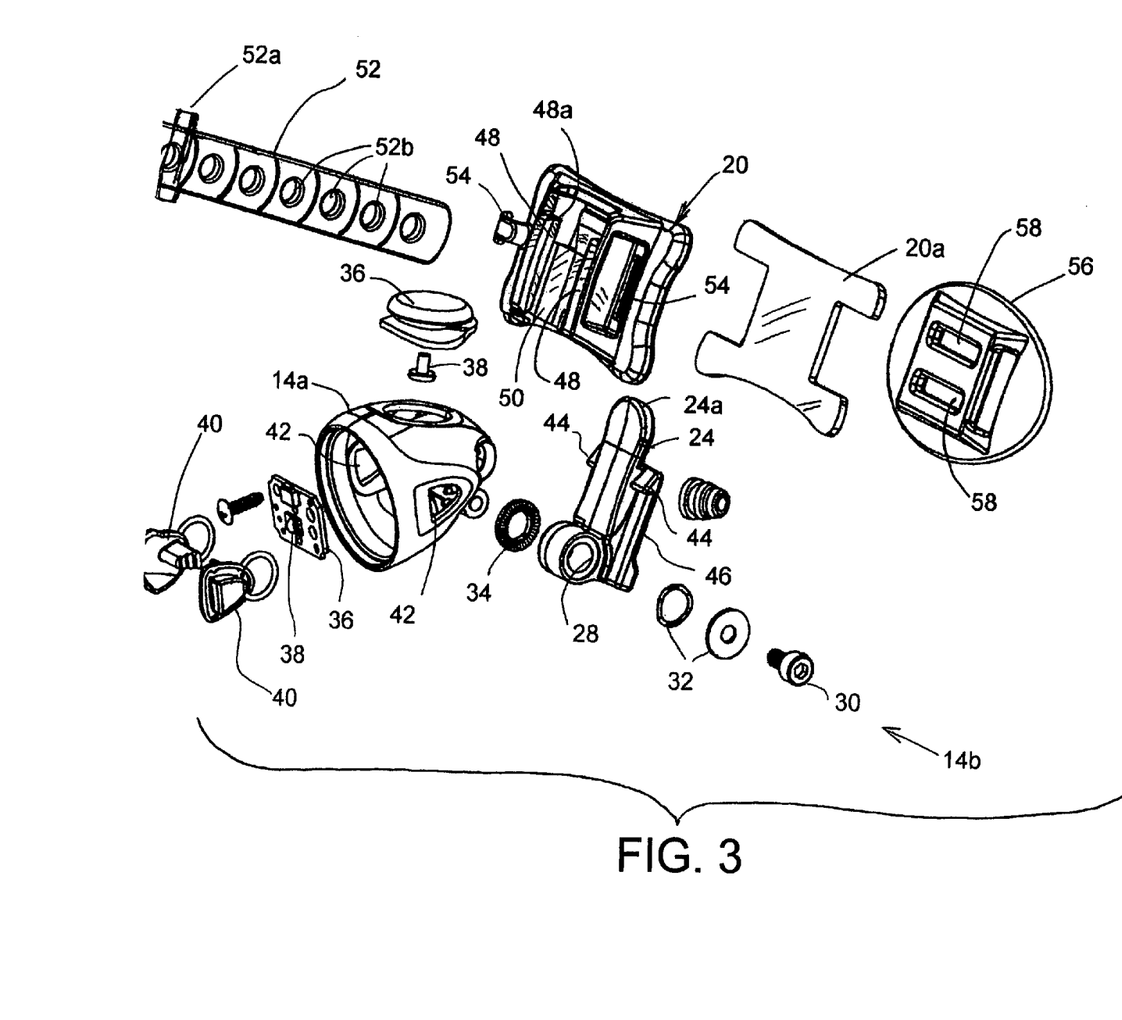
FIG. 3 is an exploded view in perspective showing the front light assembly with its mounting base.

FIG. 3 shows in an exploded view the major components of the front light assembly 14. The drawing shows the front housing 14a with pivot connection 14b to the release lever or latch 24, via a bearing hole 28 and a fastener 30, washers 32 and a ratchet washer 34. The housing receives a control switch button 36 that operates an internal switch by a switch button pusher 38 that also provides a tactile feedback to the user. All control of front and rear lights is via this switch button 36, readily accessible by the user with the front light assembly 14 mounted at the front of the housing as shown in FIG. 1. In a preferred sequence of light settings the rear light (red) preferably always flashes, with the front light sequences being bright; dim; and flashing at the dim level. The amber light is on whenever the lights are on, and its source preferably is the main (white) LED. Holding the button down turns the lights off.

FIG. 3 also shows a printed circuit board 36 which includes an LED 38, and amber side windows 40 through which a portion of the light from the LED 38 passes, for side lighting. These windows are seated in side window openings 42 of the housing. Other optics of the forward light are not shown but can be conventional.

Figures 3A, 3B:
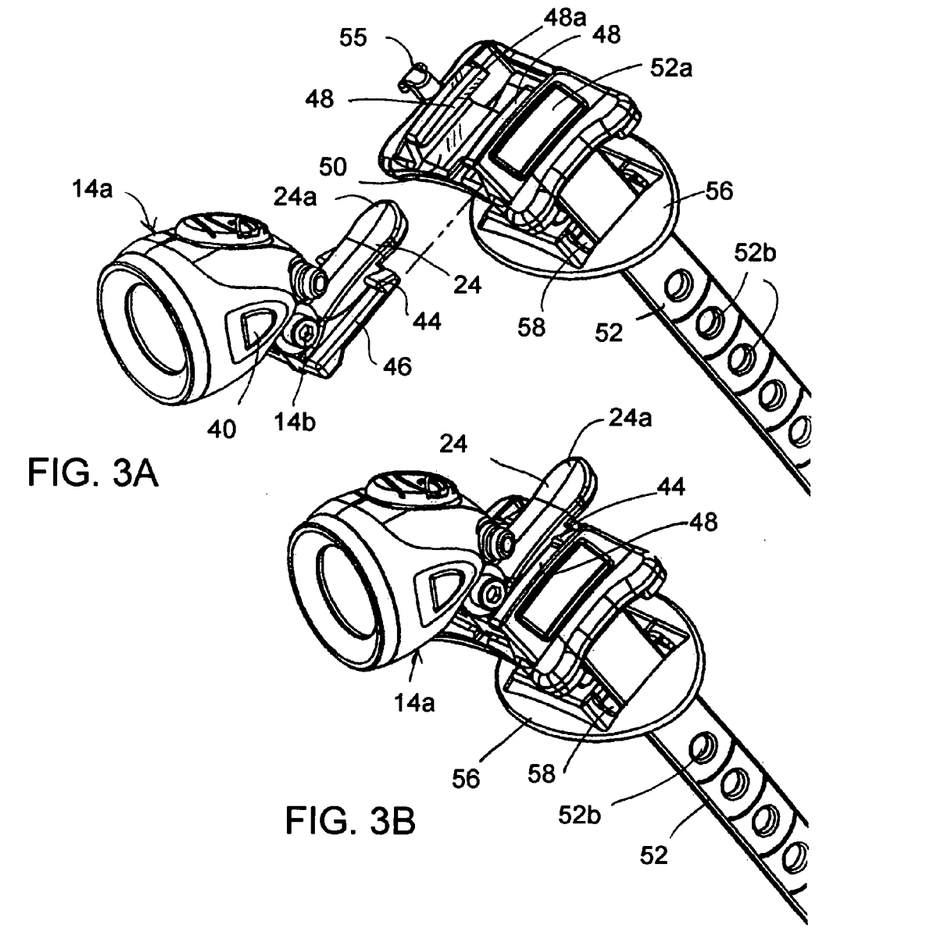
FIGS. 3A and 3B are perspective views showing attachment of the front light housing to its base in a quick-disconnect arrangement.

FIG. 3, along with FIGS. 3A and 3B, also illustrates the interaction between the latching lever or release lever 24 and the base 20 for the front light. The latch lever has left and right upwardly extending hooks or locking barbs 44 that, along with the edges 46 of the lever latch 24, slide under a pair of flanges 48 that are spaced out from a floor 50 of the base and form a slot for the lever, then snap up and latch against ends 48a of the flanges to hold the light housing in place on the base. A spring tab 51 angles up from the floor 50 to hold the lever 24 up in the locked position. Depressing of the end 24a of the lever, down toward the base floor 50, releases the lever latch and the light casing from the base, allowing the housing to be slid out from the base. The rider has easy access to the lever 24, as can be seen from FIG. 1.

At the back of the base 20 is a rubbery or elastomeric grip 20a for engaging the helmet. A strap 52 is indicated in the drawings. Preferably it is connected in an essentially fixed way to an opening 54 at one side of the base, passing through that opening and being stopped by an end stop 52a of the strap, then being looped around through the helmet at rear and coming forward through a slot on the opposite side, not visible in FIG. 3 but directly adjacent to a strap locking post 55 over which one of the holes 52b of the strap can be engaged for appropriately tightening the base on the helmet. FIGS. 3A and 3B show the strap in place in the hole 54 with the end stop 52a engaging around the hole. A mount backer disc 56 with strap openings 58 can be provided for positioning on the inside of the helmet, to receive the strap 52 as shown in FIGS. 3A and 3B, for a helmet having a center vent rather than a center rib.

Figure 4:
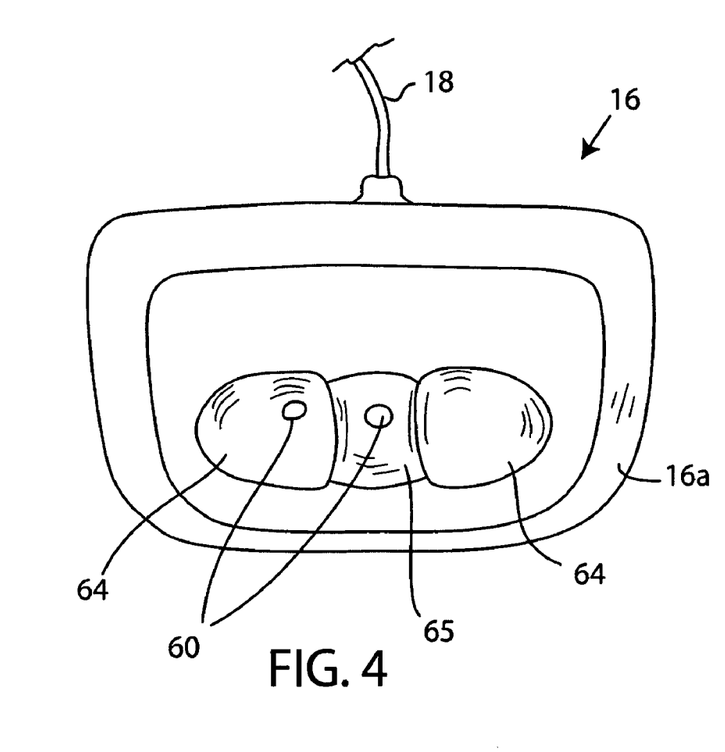
FIG. 4 is a rear view of the rear light of the lighting system.
Figure 5:
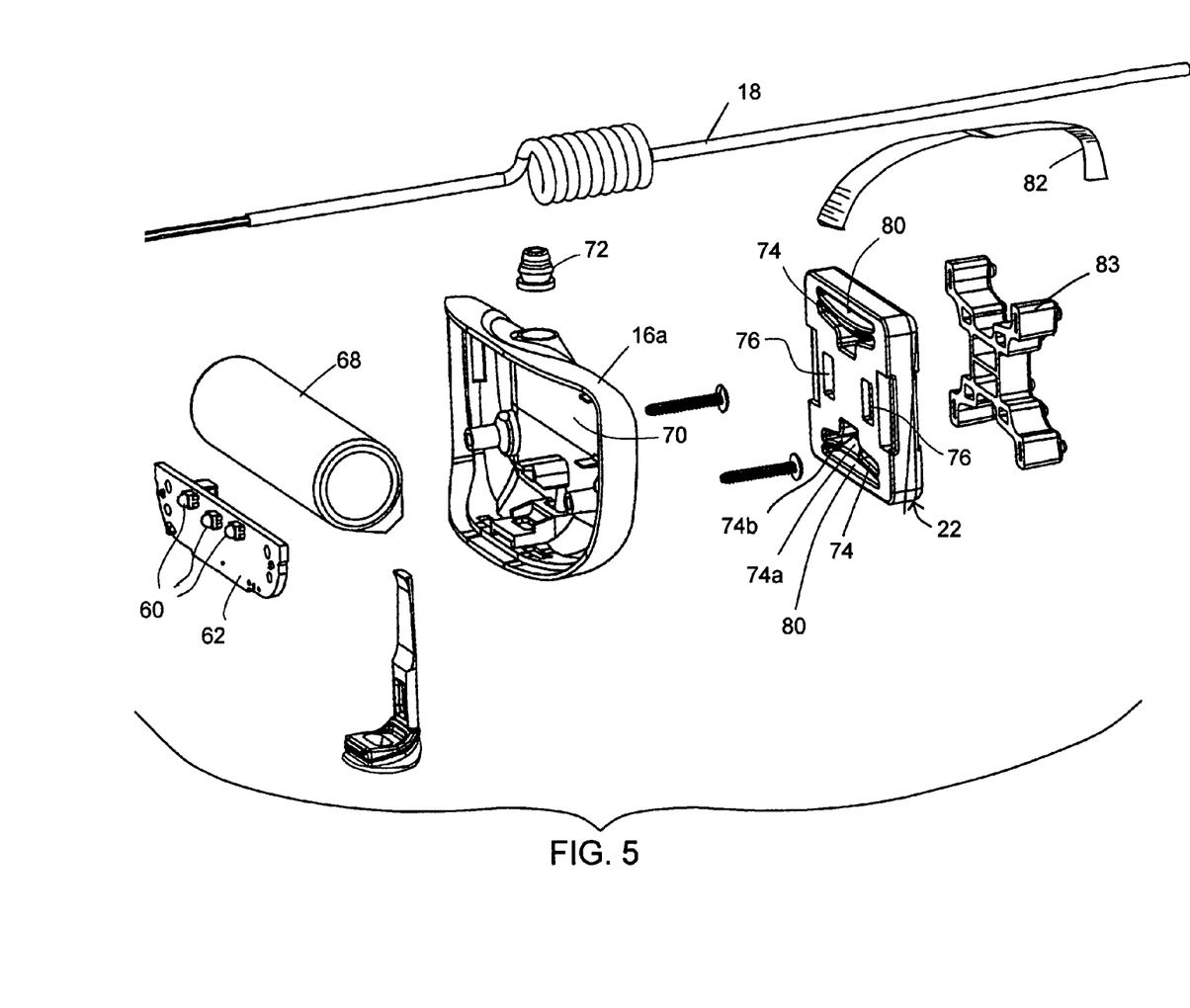
FIG. 5 is an exploded perspective view indicating assembly of the rear light/battery housing to its mounting base.

FIG. 4 is a back view of the rear light/battery casing assembly 16. In this preferred embodiment the rear light has three LEDs 60, as seen in FIG. 5 on a PC board 62, projecting at 60 in FIG. 4 surrounded by reflectors 64 and 65 (on a unitary body), which may be approximately parabolic depending on how broad an angle of rear projection is desired. Those reflectors preferably are shaped to project a beam having greater width than height.

Amber side light can be provided in the rear light assembly, as well as (or alternative to) the front. Side light LEDs 63 are shown on the PC board 62 in FIG. 5 and discussed further in reference to FIG. 7.

Figures 6, 6A:
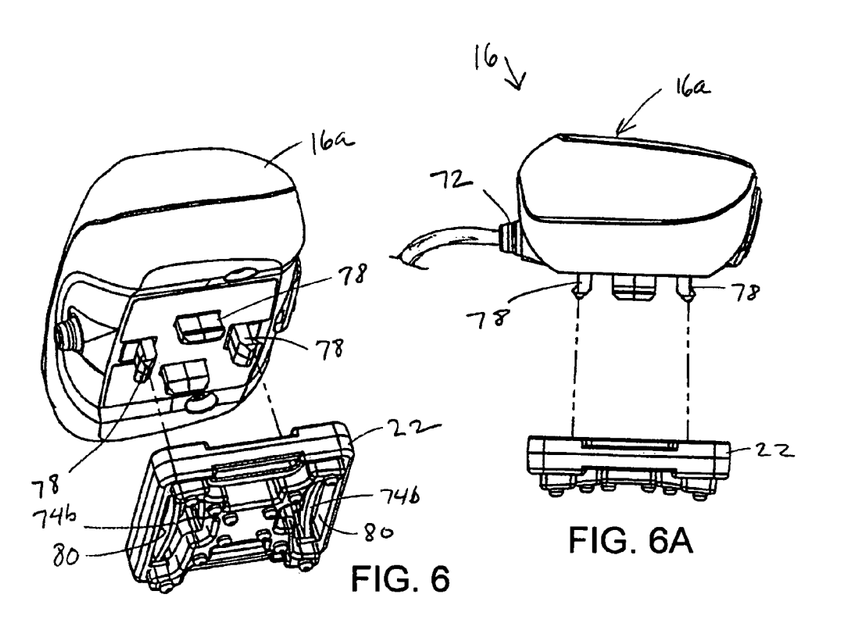
FIGS. 6, 6A and 6B are exploded perspective and side views and a sectional view showing the back side of the rear light/battery casing to its base, with FIG. 6B showing the two components attached together.
Figure 6B:
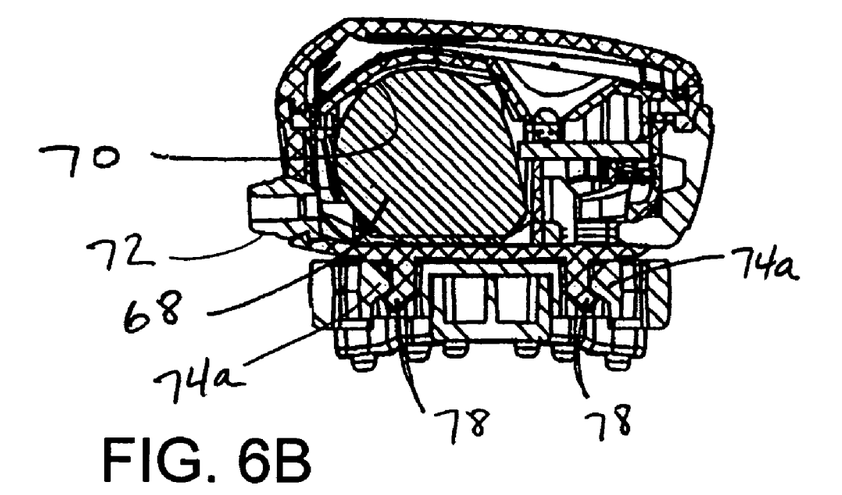
Figure 7:
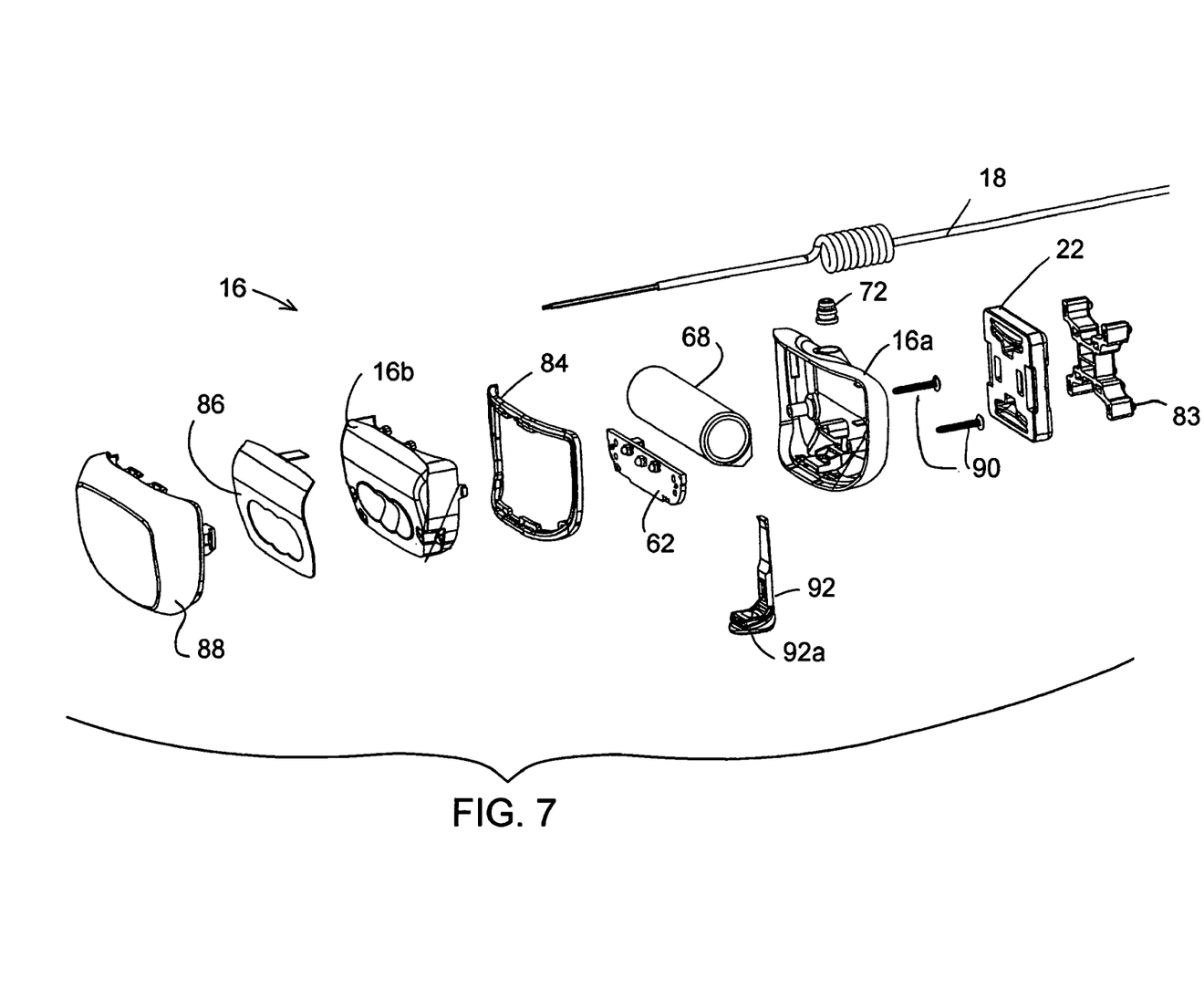
FIG. 7 is an exploded view indicating components and assembly of the rear/light battery casing.

FIG. 5 shows a part of the rear light assembly in detail in exploded view, and FIGS. 6, 6A and 6B show details. FIG. 7 shows essentially the entire assembly of the rear light/battery casing 16. A battery 68, which can be a single cell lithium-ion battery, fits into the casing 16a at 70. The cable 18 fits into the housing 16a through a strain relief bushing 72.

FIG. 5 shows the base 22, indicating, along with FIGS. 6, 6A and 6B, how the housing 16a connects with the base in a manner that allows quick release from the base. The base 22 includes four openings 74 and 76 for receiving the four locking tabs 78 fixed to the back side of the casing 16a. The connection between the casing and the base 22 allows for different, 90° rotated orientations between the two components, with two of the base openings 76 only accommodating the locking tabs but not engaging with them. The openings 74, shown at upper and lower positions in FIG. 5 but which could be rotated to left and right positions (depending on the helmet), have spring tabs 74a that are mounted on plastic leaf springs 74b so that when the housing is pressed against the base two opposed locking tabs 78 of the housing snap over the spring-biased tabs 74a in the openings 74 and firmly retain the housing to the base. Adjacent to each of the spring locking tabs 74a is a slot 80 to receive a strap 82 that can have hook and loop fasteners so as to securely connect the base 22 to a helmet. A mount pad 83 of a flexible, conformed material fits into the front side (appearing rear in FIG. 5) of the rear base 22. It fits into spaces in that side of the base, as partly visible in FIG. 6.

FIG. 7 shows essentially the entire assembly of the rear light 16, including the components described with reference to FIGS. 5 and 6 and also including a combined reflector body 16b, a gasket 84, a retro reflector 86 that seats against the reflector 16*b* and provides a retro reflector surrounding the LED lights, and a lens or window 88 (forming a part of the housing 16*a*). Machine screws 90 are shown, for passing through the back part of the housing 16*a*, through the PC board 62 and connecting with the reflector body 16*b*. The PC board 62 has a charging port (now shown) that extends to an opening at the bottom of the housing 16*a*, preferably a micro USB charging port, the PC board being connected to the battery 68. A charge port plug 92 is shown for assembly up into the housing 16*a*, providing a rubbery flap 92*a* to cover the charging port. This allows the battery 68 to be charged with a standard cell phone charger or a micro USB cable connected to a computer.

As can be seen or envisioned from FIG. 7, the amber side light LEDs 63 on assembly can be positioned adjacent to small side reflectors 94 to project the side lighting as desired.

The helmet-mounted light apparatus is light in weight, no more than about 130 to 135 grams as discussed above. At high front beam the light exhibits run time of about two hours; at low front beam about four hours; and on flash mode about ten hours. Charge time may be about five hours or less. Total light output (high) is about 110 to 120 lumens, with the rear light about 4 lumens, although this could be higher.

Several features of the described preferred embodiment can be varied. For example, other means of attachment of the front and rear bases to the helmet can be used. The bases, or either of them, could be glued onto the helmet, especially for non-conventional helmets which have no convenient vent openings or ribs. They could be affixed with machine bolts, screws or other features. The bases (or either of them) could have electrical contacts to engage with contacts on the front and/or rear light housings, with the wire cable fed through the inside of the helmet, between bases. Thus, the rear housing alone could be removed for charging. Another variation is a custom bicycle helmet having the bases built in or affixed and with conductors in the helmet connecting the two bases. The conductors could comprise a cable or conductive strips or traces in the helmet.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A bicycle helmet lighting system providing lighting for night riding, comprising:
    a front light assembly mounted on the helmet at or adjacent to a most forward point on the helmet, the front light assembly including a front light housing with a pivot adjustment to adjust the aim of the light up or down, and the front light assembly being without a battery,
    a rear light assembly projecting red light in a rearward direction, the rear light assembly being secured to the helmet at a rear position, on a rear-facing tail portion of the helmet, in a position low on the helmet, the rear light assembly including a rear housing holding a rechargeable battery,
    an electric cable connecting the rear light housing with the front light housing,
    a switch on exterior of the front light assembly, accessible for manual use by a rider, the switch effective to switch on the front and rear lights by connecting the lights to power from the battery in the rear light assembly, and
    the front light assembly including a base secured to the helmet and the rear light assembly including a rear base secured to the helmet, and both the front and rear light housings being quickly releasable from their bases.

2. The bicycle helmet lighting system of claim 1, wherein the front light assembly further includes side lights for projecting amber light to left and right, whereby the bicycle rider is visible from all positions around the bicycle.

3. The bicycle helmet lighting system of claim 1, wherein the rear light assembly includes a battery charging port at exterior of the rear housing and comprising a micro USB port, whereby the battery can be recharged using a standard mobile phone charging cable or a micro USB computer-connected cable, the port being positioned to be accessible to a charging cable when the rear light assembly is mounted on a helmet.

4. The bicycle helmet lighting system of claim 1, wherein the rear light housing assembly with battery has a weight no greater than about 90 grams.

5. The bicycle helmet lighting system of claim 1, wherein the weight of the front and rear light assemblies with cable and battery is no greater than about 135 grams.

6. The bicycle helmet lighting system of claim 1, wherein the front lighting assembly has a weight no greater than about 40 grams.

7. The bicycle helmet lighting system of claim 1, wherein the front light assembly base is secured by a strap to the helmet.

8. The bicycle helmet lighting system of claim 1, wherein the rear base is secured by a strap to the helmet.

9. The bicycle helmet lighting system of claim 1, wherein the switch is at a top surface of the front light housing.

10. The bicycle helmet lighting system of claim 1, wherein the rear light housing has at least two locking tabs extending back from a back side of the rear housing, the rear base including openings to receive the locking tabs, with spring-biased latch elements adjacent to the openings to engage with the locking tabs in a way to provide for quick release of the rear light housing from the rear base by pulling the rear housing outwardly.

11. The bicycle helmet lighting system of claim 1, wherein the front light housing comprises a light casing and a release lever pivotally connected to the light casing and providing said pivot adjustment, the release lever being slidable into a slot of the front light assembly base and having at least one barb on the release lever engageable with structure in the slot of the base to lock the front light housing onto the base except when an end of the release lever is depressed to allow the front light assembly to be slid out from the base.

12. The bicycle helmet lighting system of claim 1, wherein the front light housing an LED light source with an output of at least about 110 lumens.

13. The bicycle helmet lighting system of claim 1, wherein the rear light housing has a plurality of red LEDs capable of flashing when turned on and which have an output of at least about 4 lumens.

14. The bicycle helmet lighting system of claim 1, wherein the switch in the front light housing has means for operating the front and rear lights so as to produce low power front light, high power front light or flashing front light while providing power to the rear light assembly in all settings.

15. The bicycle helmet lighting system of claim 14, wherein the rear light is in flashing mode during all settings of the front light.

16. The bicycle helmet lighting system of claim 1, wherein the front light housing includes means for projecting amber light toward both left and right sides, whereby the bicycle rider is visible from all positions around the bicycle.

17. The bicycle helmet lighting system of claim 16, wherein the front light housing includes a PC board with a single LED light source, and wherein the amber light projecting means comprising means for directing a portion of the LED light out through the sides of the front light housing, with amber lenses to produce amber light to the sides.

18. The bicycle helmet lighting system of claim 1, wherein the rear housing includes a retro reflector.

19. The bicycle helmet lighting system of claim 1, wherein the helmet includes no lighting component extending upwardly from the top of the helmet.

20. A lighting system for mounting on the helmet of a bicycle rider, comprising:
- a front light assembly including a mounting base for mounting on the helmet at or adjacent to a most forward point on the helmet, the front light assembly including a front light housing with a pivot adjustment to adjust the aim of the light up or down, and the front light assembly being without a battery,
- a rear light assembly projecting configured to project red light in a rearward direction, the rear light assembly having a mounting base for securing to the helmet at a rear position, on a rear-facing tail portion of the helmet, the rear light assembly including a rear housing holding a rechargeable battery,
- an electric cable connecting the rear light housing with the front light housing,
- a switch on exterior of the front light assembly, accessible for manual use by a rider, the switch effective to switch on the front and rear lights by connecting the lights to power from the battery in the rear light assembly, and
- both the front and rear light housings being quickly releasable from their bases.

21. The bicycle lighting system of claim 20, wherein the rear light assembly includes a battery charging port at exterior of the rear housing and comprising a micro USB port, whereby the battery can be recharged using a standard mobile phone charging cable or a micro USB computer-connected cable.

* * * * *